July 9, 1940.  W. R. LUSTIG  2,206,909

LID SUPPORT

Filed July 9, 1937  2 Sheets-Sheet 1

Inventor:
Walter R. Lustig
By
Wilson, Dowell,
McCanna & Wintercorn
Attys.

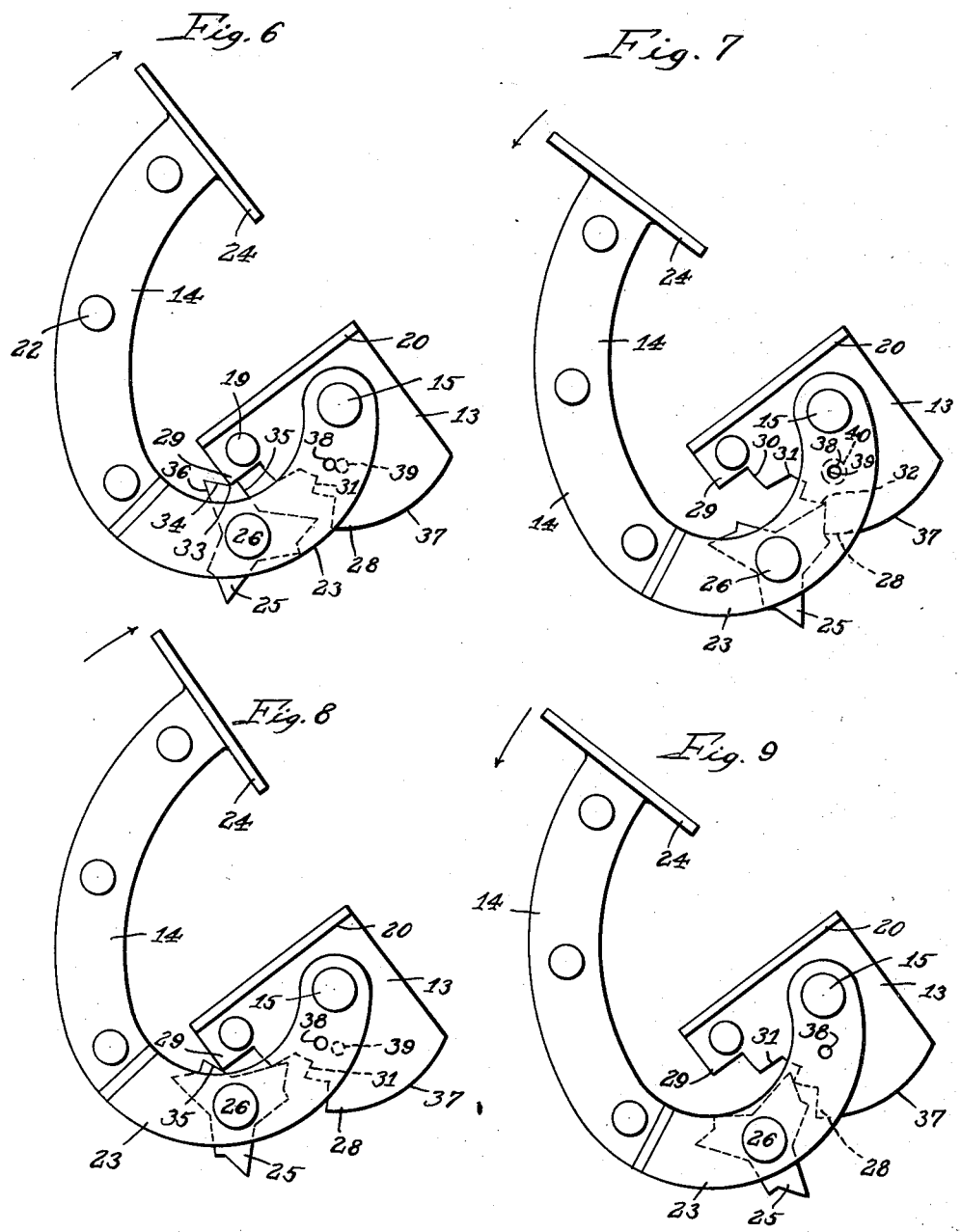

Patented July 9, 1940

2,206,909

UNITED STATES PATENT OFFICE 2,206,909

LID SUPPORT

Walter R. Lustig, Rockford, Ill.

Application July 9, 1937, Serial No. 152,744

4 Claims. (Cl. 16—138)

This invention relates in general to supports for liftable hinged closures, and is more particularly concerned with a support for the lid of a luggage compartment on an automobile or other vehicle.

Lid supports are now commonly provided separate from and in spaced relation to the lid's hinges. It is the principal object of my invention to incorporate the lid support in one or both of the hinges, the hinges being of a detent type with a novel form of positive action pawl and ratchet means for automatically releasably locking the members thereof in supporting relation. In that way I realize a saving in cost and reduce the number of assembling operations at the automobile factory, besides providing a support which is superior to others previously available in various respects.

The invention is illustrated in the accompanying drawings, in which—

Figs. 6 to 9 are views similar to Fig. 3, but showing the parts in different positions throughout a cycle of operation.

The same reference numerals are applied to corresponding parts throughout the views.

Figure 1:
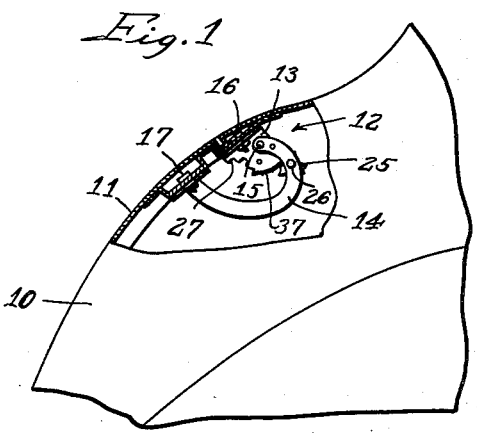
Figure 1 is a side view of the rear portion of an automobile, showing a support made in accordance with my invention, the lid being shown closed.
Figure 2:
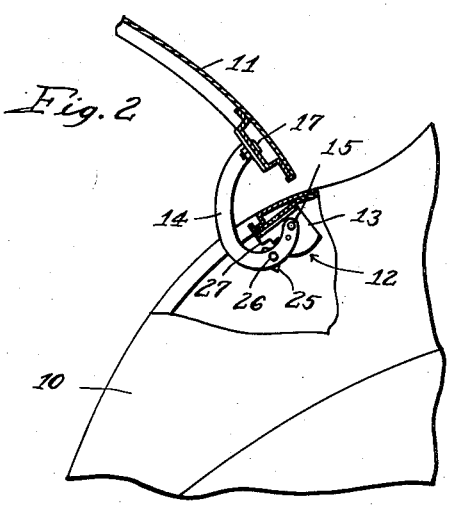
Fig. 2 is a similar view showing the lid opened and supported in raised position.

Referring first mainly to Figs. 1 and 2, the reference numeral 10 designates the luggage compartment of an automobile, and 11 its lid or door arranged to be hinged to the wall of the luggage compartment to permit raising and lowering the lid to and from the open position illustrated in Fig. 2. I have shown at 12 a combination hinge and lid support, and it should be evident that I may provide this in conjunction with any ordinary hinge designed to give corresponding throw of the lid, or I may employ two of these devices in laterally spaced coaxial relation to hinge and support the lid.

The combination hinge and lid support 12 comprises an attaching bracket 13 and lid-supporting arm 14 pivotally connected at 15, the bracket 13 being bolted or otherwise suitably secured at 16 to the body, and the arm 14 being similarly secured at 17 to the lid. There are two angular sheet metal pieces 18 riveted together, as at 19, to form the bracket 13 while providing oppositely bent flanges 20 for bolting the bracket to the body at 16. The arm 14 is likewise formed from two angular pieces 21 of sheet metal riveted together, as at 22, and providing a fork 23 at one end to receive the bracket 13 and the rivet 15 for pivotally connecting the members. The other end of the pieces 21 are bent outwardly in opposite directions to provide flanges 24 for bolting the arm to the lid at 17. The arm 14 is generally C-shaped to permit raising the lid 11 to and slightly beyond the position shown in Fig. 2, in which position the top wall of the luggage compartment projects into the space between the ends of the arm 14, as shown. The fork 23 on the pivoted end of the arm 14 also provides a place therein for rotatably mounting the three-toothed or star-shaped pawl 25 on a rivet 26 to cooperate with a ratchet 27 formed on the bracket 13. A spring washer 28' held in place with the pawl 25 by the rivet 26 keeps the pawl under spring pressure toward snug frictional engagement with one side of the fork 23 to impose sufficient drag upon the rotation of the pawl to insure its staying in one position until forcibly moved to another.

The pawl 25 and ratchet 27 in accordance with my invention are so constructed with relation to one another that the pawl catches on the ratchet and thereby locks the arm 14 on each alternate oscillation thereof relative to the bracket 13, the arm 14 being free in between these operations to move relative to the bracket 13 to the position shown in Fig. 1, with the lid 11 closed. This is clearly illustrated in Figs. 6 to 9 and 3. The ratchet 27 comprises two laterally spaced teeth 28 and 29, the former of which is slightly shorter than the latter, both having their peripheries struck on arcs with the pivot 15 as a center. The bracket 13 is cut away between the teeth 28 and 29 on an arc, as at 30, with the pivot 15 as a center, and a clearance notch 31 is made in the bracket in spaced relation to the tooth 28 so as to leave a shoulder 32 next to the tooth. Each tooth of the pawl 25 is generally triangular in form, but has a notch 33 provided in one side thereof between two angularly related surfaces 34 and 35 forming that side of the tooth. The other side 36 of each tooth is straight.

Figure 3:
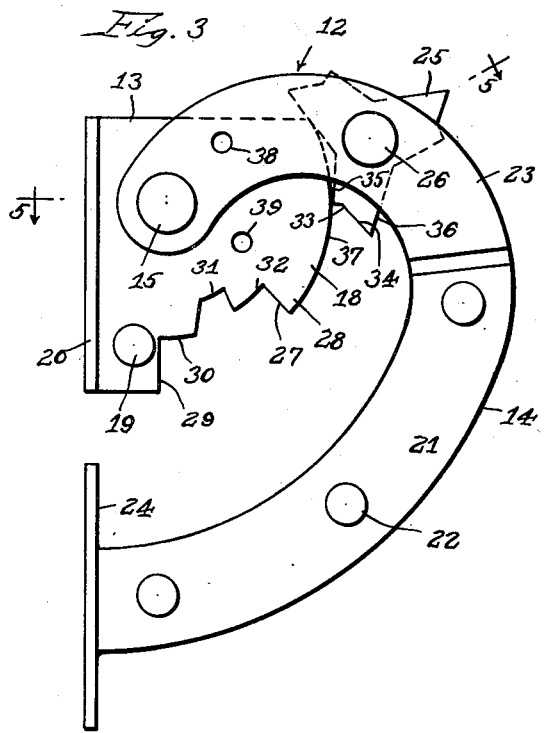
Fig. 3 is a side view of the support approximately full size detached from the lid and body.
Figure 4:
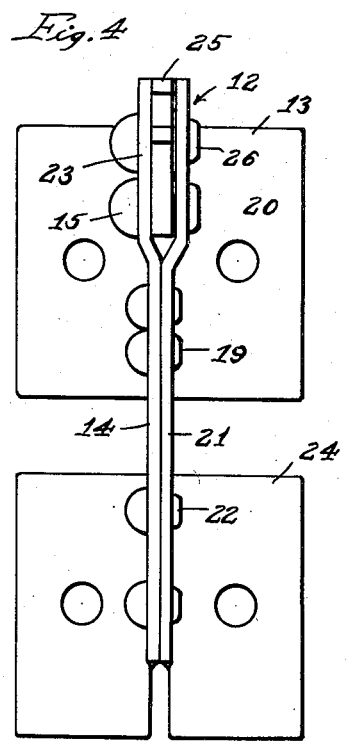
Fig. 4 is a rear view of Fig. 3.
Figure 5:
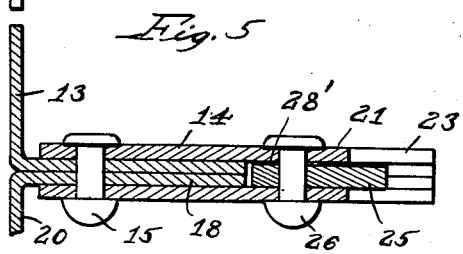
Fig. 5 is a sectional detail on the line 5—5 of Fig. 3.

In operation, when the lid 11 is being closed, the pawl 25, as shown in Fig. 9, is turned in a counter-clockwise direction by abutment with the tooth 28 of the ratchet until it rides out of the cut-away portion of the bracket and onto the arcuate periphery 37 that is struck on an arc with the pivot 15 as a center. This arcuate periphery extends far enough, as indicated in Fig. 3, so that when the lid 11 is fully closed, the pawl 25 is still in engagement with the periphery 37. The latter is coextensive with the periphery of the tooth 28 and is hence on a smaller radius than the periphery of the tooth 29, so that the pawl 25 in riding off the periphery 37 when the lid 11 is raised, as indicated in Fig. 6, is bound to strike the tooth 29, thereby positively limiting the raising of the lid. The pawl in this movement of the arm 14 is carried with the arm about the pivot 15 as a center in a clockwise direction, and the tooth 29 first encounters the angular surface 34 on one side of the notch 33 on the adjacent tooth of the pawl, and turns the pawl slightly in a counter-clockwise direction until the tooth 29 of the ratchet stops in the notch 33 on the pawl when, of course, there can be no further movement of the lid. The slight shift of the pawl 25 is important because it is thereby indexed properly with respect to the tooth 28, and when the lid is allowed to return slightly, as indicated in Fig. 7, the next tooth of the pawl strikes the side of the tooth 28 of the ratchet, thereby turning the pawl 25 still further in a counter-clockwise direction about its pivot 26 until the end of the tooth on the pawl strikes the shoulder 32 on the ratchet. This positively limits the return or downward movement of the lid, and the arm 14 bears by means of the pawl against the bracket 13, supporting the lid 11 in the raised open position illustrated in Fig. 2. The lid is securely supported because there is no "hair trigger" action as in certain old styles of over-center type supports. In fact, the pawl 25 will remain in the lid-supporting relation of Fig. 7 even if the lid happens to be raised a trifle accidentally, as by being brushed against, or by reason of the car being jostled, or because of wind pressure against the inner side of the lid. Hence, there is no danger of the lid accidentally dropping and damaging anything or causing injury to anyone. The only way the lid can be closed is by raising it as far as it will go and then letting it drop or lowering it. In that operation, the arm 14 is first moved from the position of Fig. 7 to that of Fig. 8 in the raising of the lid, and then from the position of Fig. 8 through that of Fig. 9 to the position of Fig. 3 as the lid is lowered or allowed to drop to closed position. It is clear in Fig. 8 that the tooth 29 in the movement of the arm 14 from the position of Fig. 7 to that of Fig. 8 has struck the surface 35 on the adjacent tooth of the pawl and turned the pawl in a counter-clockwise direction enough to bring the end of the next tooth of the pawl into the clearance notch 31, so that, in the subsequent lid closing movement of the arm 14, the tooth 28 striking the notched side of that tooth will turn the pawl 25 in a counter-clockwise direction through about 90° to the position of Fig. 3, ready for the next cycle. The spring washer 28′ in between the positive movements of the pawl by engagement with the ratchet holds the pawl against accidental turning, and, of course, the importance of this is self-evident. At the end of the cycle when the pawl is in engagement with the arcuate periphery 37 of the bracket 13, it is positively held against accidental turning out of position, and it cannot therefore be shifted by coming in contact with objects in the luggage compartment, but will be certain to cooperate properly with the ratchet the next time the lid is raised. It is obviously important in the operation of the lid to raise it as far as it will go, otherwise the pawl 25 would not be turned by engagement with the tooth 29 of the ratchet, as previously described in connection with Fig. 6. The operator soon finds in the manipulation of the lid that proper functioning of the support necessitates raising the lid as far as it will go.

It will be noticed that there are holes 38 in the forked end 23 of the arm 14 spaced from the pivot 15 the same distance as a hole 39 of the same size provided in the bracket 13. These holes come into register when the arm 14 is locked in lid supporting position, as shown in Fig. 7. One can then enter a nail or cotter-pin through these registering holes, as indicated by the nail head in dotted lines at 40 in Fig. 7, whereby to positively lock the arm 14 against swinging movement with relation to the bracket 13. This is a safety feature which the automobile manufacturer requires for protection of the workmen on the car assembly line who make it a practice to leave the lid raised after the lid support has been assembled on the car, thus giving rise to danger of injury to the other workmen if the car happens to be jostled sufficiently to cause the lid to drop. However, the motorist may also use this safety lock under certain conditions where this extra precaution against possibility of the lid dropping seems warranted, although there is ordinarily no need for the observance of such a degree of caution in the regular use of the device.

The present lid support has an important advantage over other lid supports in being embodied directly in the lid-supporting hinge, and there is still another important advantage in this support over others constructed with pin and slot connections between the parts thereof, because those supports are apt to develop rattles, whereas there is nothing in the present construction apt to rattle when the lid is closed and the car is in motion. The fact that the pawl 25 is positively indexed in the movement of the lid is also an important advantage, because certain other types of supports relied on the effect of gravity for successful operation and were therefore apt to function poorly, or not at all, under certain conditions where the car did not happen to be on an even keel. The present support, in other words, is positive in its operation, and fool-proof, besides being simpler and more economical in construction than most other supports with which I am familiar. The fact that the one device serves a double function obviously means a saving in cost, because the combination hinge and support does not cost much more to manufacture than an ordinary hinge; that is to say, the additional support feature incorporated in the hinge represents a small fraction of what a separate support would cost.

It is believed the foregoing description conveys a good understanding of the objects and advantages of my invention. The appended claims have been drawn with a view to covering all legitimate modifications and adaptations.

I claim:

1. A hinge of the character described comprising a fixed bracket member adapted to be mounted on a support for a hinged closure, and a hinge member pivoted to said bracket member and adapted to be mounted on the closure, the bracket member having an arcuate periphery substantially concentric with the pivot, said periphery being recessed at one point to provide a ratchet comprising two circumferentially spaced radial abutments with an arcuate peripheral portion therebetween of smaller radius than the rest of the periphery, which is further recessed intermediate the two abutments to provide a tooth clearance space, and a pawl rotatably mounted on the hinge member for sliding engagement with the periphery of the bracket member for engagement with said abutments and clearance recess, one of said abutments being longer radially than the other, and said pawl having at least two radial teeth in equally circumferentially spaced relation and these being two adjacent ones of said teeth disposed in cooperative relation with said ratchet during each cycle of operation, each tooth of the pawl having a V-notch in the outer end thereof so as to provide two shoulders, one for engagement with the longer and the other for engagement with the shorter of said abutments to limit relative oscillatory movement between the hinge member and bracket member, the one shoulder on one of the two teeth cooperating with the ratchet being arranged to engage the longer abutment to limit movement in one direction and the other shoulder on the other of the two teeth cooperating with the ratchet being arranged to engage the shorter abutment to limit movement in the opposite direcion.

2. A hinge of the character described comprising a fixed bracket member adapted to be mounted on a support for a hinged closure, and a hinge member pivoted to said bracket member and adapted to be mounted on the closure, the bracket member having an arcuate periphery substantially concentric with the pivot, said periphery being recessed at one point to provide a ratchet comprising two circumferentially spaced radial abutments, and a pawl rotatably mounted on the hinge member for sliding engagement with the periphery of the bracket member for engagement with said abutments, one of said abutments being longer radially than the other, and said pawl having at least two radial teeth in equally circumferentially spaced relation and there being two adjacent ones of said teeth disposed in cooperative relation with said ratchet during each cycle of operation, each tooth of the pawl having a V-notch in the outer end thereof so as to provide two shoulders, one for engagement with the longer and the other for engagement with the shorter of said abutments to limit relative oscillatory movement between the hinge member and bracket member, the one shoulder on one of the two teeth cooperating with the ratchet being arranged to engage the longer abutment to limit movement in one direction and the other shoulder on the other of the two teeth cooperating with the ratchet being arranged to engage the shorter abutment to limit movement in the opposite direction.

3. A device of the character described for supporting a hinged closure in raised position relative to its support comprising releasably interlockable members pivotally connected together, one mounted on said closure and the other on said support, the one member having an arcuate periphery substantially concentric with the pivot, said periphery being recessed at one point to provide a ratchet comprising two circumferentially spaced radial abutments with an arcuate periphery portion therebetween of smaller radius than the rest of the periphery, which is further recessed intermediate the two abutments to provide a tooth clearance space, and a pawl rotatably mounted on the other member for sliding engagement with the periphery of the first member for engagement with said abutments and clearance recess, one of said abutments being longer radially than the other, and said pawl having at least two radial teeth in equally circumferentially spaced relation and there being two adjacent ones of said teeth disposed in cooperative relation with said ratchet during each cycle of operation, each tooth of the pawl having a V-notch in the outer end thereof so as to provide two shoulders, one for engagement with the longer and the other for engagement with the shorter of said abutments to limit relative oscillatory movement between said members, the one shoulder on one of the two teeth cooperating with the ratchet being arranged to engage the longer abutment to limit movement in one direction and the other shoulder on the other of the two teeth cooperating with the ratchet being arranged to engage the shorter abutment to limit movement in the opposite direction.

4. A device of the character described for supporting a hinged closure in raised position relative to its support comprising releasably interlockable members pivotally connected together, one mounted on said closure and the other on said support, the one member having an arcuate periphery substantially concentric with the pivot, said periphery being recessed at one point to provide a ratchet comprising two circumferentially spaced radial abutments, and a pawl rotatably mounted on the other member for sliding engagement with the periphery of the first member for engagement with said abutments, one of said abutments being longer radially than the other, and said pawl having at least two radial teeth in equally circumferentially spaced relation and there being two adjacent ones of said teeth disposed in cooperative relation with said ratchet during each cycle of operation, each tooth of the pawl having a V-notch in the outer end thereof so as to provide two shoulders, one for engagement with the longer and the other for engagement with the shorter of said abutments to limit relative oscillatory movement between said members, the one shoulder on one of the two teeth cooperating with the ratchet being arranged to engage the longer abutment to limit movement in one direction and the other shoulder on the other of the two teeth cooperating with the ratchet being arranged to engage the shorter abutment to limit movement in the opposite direction.

WALTER R. LUSTIG.